US010594661B1

(12) United States Patent
Pachkov et al.

(10) Patent No.: US 10,594,661 B1
(45) Date of Patent: Mar. 17, 2020

(54) SYSTEM AND METHOD FOR RECOVERY OF DATA PACKETS TRANSMITTED OVER AN UNRELIABLE NETWORK

(71) Applicant: Parallels International GmbH, Schaffhausen (CH)

(72) Inventors: Sergey Pachkov, Moscow (RU); Nikolay Dobrovolskiy, Moscow (RU); Serguei M. Beloussov, Costa Del Sol (SG)

(73) Assignee: Parallels International GmbH, Schaffhaussen (CH)

( * ) Notice: Subject to any disclaimer, the term of this patent is extended or adjusted under 35 U.S.C. 154(b) by 185 days.

(21) Appl. No.: 15/620,956

(22) Filed: Jun. 13, 2017

(51) Int. Cl.
 *H04L 29/00* (2006.01)
 *H04L 29/06* (2006.01)
 *H04L 1/00* (2006.01)

(52) U.S. Cl.
 CPC ........ *H04L 63/0281* (2013.01); *H04L 1/0041* (2013.01); *H04L 63/166* (2013.01); *H04L 69/161* (2013.01)

(58) Field of Classification Search
 CPC ........... H03M 13/2909; H03M 13/353; H03M 13/35; H04L 1/1819; H04L 1/1812; H04L 1/1874; H04L 1/1877; H04L 1/1896; H04L 1/18; H04L 63/0281; H04L 63/166; H04L 69/161; H04L 1/0041
 See application file for complete search history.

(56) References Cited

U.S. PATENT DOCUMENTS

| 7,660,245 B1* | 2/2010 | Luby | H04L 1/0041 370/230 |
| RE46,740 E * | 2/2018 | Lee | H03M 13/27 |
| 2002/0159454 A1* | 10/2002 | Delmas | H04L 1/004 370/389 |
| 2003/0016700 A1* | 1/2003 | Li | H04L 1/0083 370/477 |
| 2007/0047575 A1* | 3/2007 | Cui | H04L 12/4633 370/465 |
| 2008/0225735 A1* | 9/2008 | Qiu | H04L 1/0009 370/252 |
| 2009/0254794 A1* | 10/2009 | Malik | H04L 1/0041 714/776 |
| 2009/0276686 A1* | 11/2009 | Liu | H04L 1/0041 714/776 |
| 2009/0319845 A1* | 12/2009 | Liu | H03M 13/3761 714/747 |
| 2009/0327842 A1* | 12/2009 | Liu | H04L 1/0057 714/776 |
| 2010/0135165 A1* | 6/2010 | Parolari | H04L 1/0083 370/252 |

(Continued)

*Primary Examiner* — Don G Zhao
(74) *Attorney, Agent, or Firm* — Lowenstein Sandler LLP

(57) ABSTRACT

A system and method is provided that enables the recovery of data packets transmitted over an unreliable network. The system and method utilize an algorithm for transmitting the data packets with restoration of lost data during data transfer over UDP Protocol encrypted with DTLS Protocol. Advantageously, the algorithm does not require changes to data for either UDP or DTLS packets, but rather a separate, specifically designed packet is transmitted to the recipient to facilitate and ensure the recovery of any lost data packets over the unreliable network.

17 Claims, 8 Drawing Sheets

(56) References Cited

U.S. PATENT DOCUMENTS

| | | | |
|---|---|---|---|
| 2010/0246602 A1* | 9/2010 | Barreto | H04L 49/90 370/466 |
| 2012/0005754 A1* | 1/2012 | Lin | H04L 29/0653 726/24 |
| 2012/0243410 A1* | 9/2012 | Vedula | H04L 41/5025 370/235 |
| 2013/0058248 A1* | 3/2013 | Singh | H04L 43/0876 370/252 |
| 2014/0317475 A1* | 10/2014 | Rozenberg | H03M 13/2909 714/774 |
| 2015/0029856 A1* | 1/2015 | Rozenberg | H04L 69/40 370/235 |
| 2017/0026650 A1* | 1/2017 | Mittal | H04N 19/159 |
| 2017/0099325 A1* | 4/2017 | Steiner | H04L 65/4061 |
| 2018/0220325 A1* | 8/2018 | Lee | H04W 28/02 |

* cited by examiner

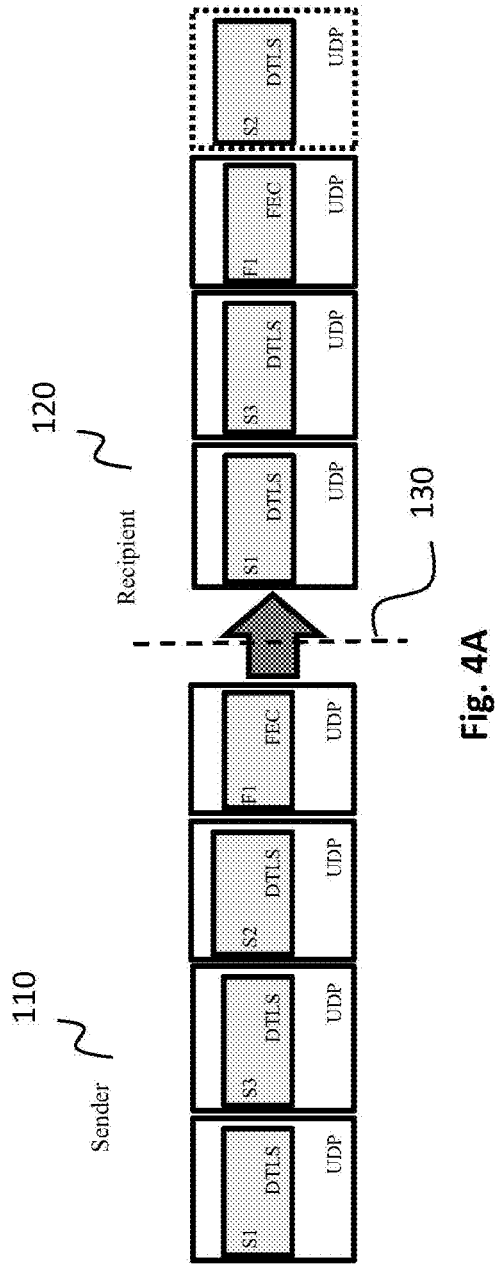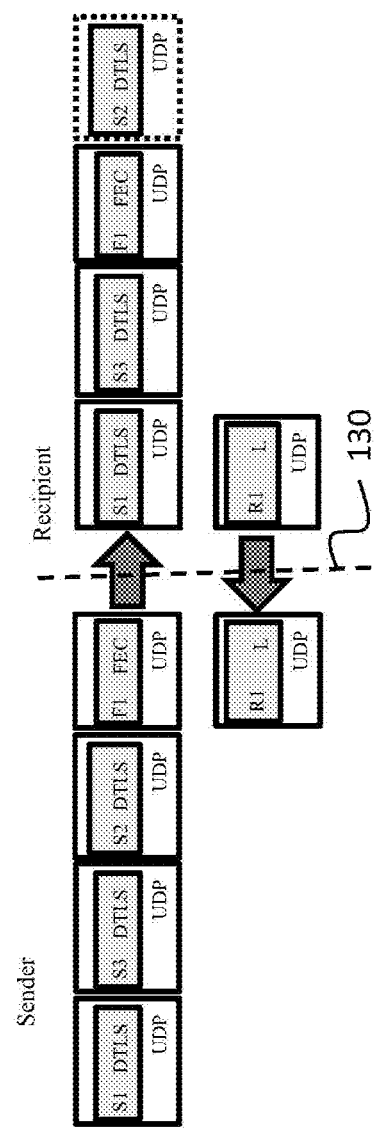
Fig. 4A
Fig. 4B

SYSTEM AND METHOD FOR RECOVERY OF DATA PACKETS TRANSMITTED OVER AN UNRELIABLE NETWORK

TECHNICAL FIELD

The system and method disclosed herein relates to data transmission and reception, and, more particularly, to a system and method for recovery of data packets transmitted over an unreliable network.

BACKGROUND

Media channels, such as audio and video channels, have long been transmitted using application specific cables. More recently, media signals have been transmitted on computer based networks using protocols such as unicast or multicast. Unicast is a method of sending data packets on a computer network to a single destination. Multicast is a protocol for efficiently sending data streams to multiple receivers at the same time on TCP/IP networks by use of a multicast address.

FIG. 1 illustrates a block diagram of a basic infrastructure for a unicast data packet transmission over an IP network. As shown, the transmitting device 10 (e.g., a server) can receive an input stream, such as a video stream, and transmit the data stream as a sequence of data packets in a uncast transmission, for example, over one or more networks 30 to a receiving device 20. One technical problem with this type of existing infrastructure is that in many instances, the one or more networks 30 may be unreliable, which leads to at least a portion of the data packets being lost in transmission.

FIG. 2A illustrates a flow diagram for data packets of the conventional infrastructure shown in FIG. 1. Typically, transmitting device 10 (i.e., the "sender") can transmit data packets using the UDP ("User Datagram Protocol") protocol. With this protocol, sender 10 can send messages (i.e., "datagrams") to the receiving device 20 (i.e., the "recipient") over an IP network. Advantageously, prior communications are not required in order to set up transmission channels or data paths through the IP network. FIG. 2A illustrates a simple case where sender 10 can send a single packet "P" of data (shown as "S1") to recipient 20. While the UDP protocol provides checksums for data integrity, it has no handshaking dialogues and exposes the data transmission to any unreliability of the IP network. As a result, there is no guarantee of delivery, ordering, or duplicate protection.

Furthermore, the sender 10 may transmit the data packets using the DTLS ("Datagram Transport Layer Security") communication protocol to provide communications security for the UDP data packets. In this regard, DTLS allows datagram-based applications to communicate in a way that is designed to prevent eavesdropping, tampering, or message forgery. However, the DTLS communication protocol, like UDP, also has to deal with packet reordering, loss of datagrams due to unreliable networks, and the like.

FIG. 2B illustrates a flow diagram of the conventional infrastructure shown in FIG. 1 in which the sender 10 transmits three separate data packets S1, S2 and S3 in sequence. As shown, due to the problems noted above, it is possible that one or more of the data packets (in this case packet S2) is lost during transmission if the underlying IP network is unreliable. As a result, the recipient 20 only receives data packets S1 and S3. Thus, while UDP and DTLS communication protocol provide certain benefits, such as avoiding overhead of processing at the network interface and for time-sensitive applications, these protocols do not have control of datagram delivery, which often results in packet loss in unreliable networks. Moreover, there is no possibility to resend these lost packets using these protocols.

In view of these problems, other protocols and standards have been developed that address the lost packet issue by transmitting a separate packet and/or separate stream to the receiving device. For example, media networks can allow for redundant media packet streams to be transmitted and received, using, for example, the SMPTE 2022-7 communication standard that duplicates the input stream and sends it via two different paths to the destination receiver. However, these technologies are quite complicated and add significant levels of processing and complexity at both the sender 10 and recipient 20.

Accordingly, a system and method is needed for reliably transmitting data using the UDP and DTLS protocols over an otherwise unreliable network.

SUMMARY

Thus, a system and method is provided herein for recovery of data packets transmitted over an unreliable network. More particularly, the system and method disclosed herein provides an algorithm for the transmitting of data packets with restoration of lost data during data transfer over UDP Protocol encrypted with DTLS Protocol. Advantageously, the disclosed system and method does not require changes to data for either UDP or DTLS packets, but rather a separate, specifically designed packet is transmitted to the recipient to facilitate the recovery of any lost data packets.

In one exemplary aspect, a method is provided for recovery of data packets transmitted over an unreliable network. In this aspect, the method includes encrypting data to be transmitted; generating forward error correction (FEC) data based on the encrypted data and a parameter L associated with a frequency of packet losses from the sending device to the receiving device over the network; and transmitting, by the sending device, a sequence of UDP data packet including the encrypted data and the FEC data to the receiving device, wherein the sequence of UDP packets comprises a number of L UDP packets having the encrypted data transmitted between each UDP packet having the FEC data.

In another aspect, the method further includes calculating, by the receiving device, the parameter L; and transmitting, by the receiving device, the parameter L in a UDP packet to the sending device.

In another aspect, the method further includes encrypting the data using the Datagram Transport Layer Security (DTLS) protocol; and calculating, by the receiving device, the parameter L based on differences in at least one packet number of the UDP packets having the encrypted data from a sequence number of the DTLS protocol in sequentially arriving packets.

In another aspect, the transmitting, by the receiving device, of the parameter L in the UDP packet comprises generating the UDP packet with the parameter L including a special byte sequence that is different than a byte sequence according to the DTLS protocol.

In another aspect, the method further includes generating, by the receiving device, at least one UDP packet including data indicating an acknowledgement of one or more of the UDP packets having the encrypted data; transmitting, by the receiving device, the generated at least one UDP packet to the transmitting device; and calculating, by the transmitting device, the parameter L based on the generated at least one UDP packet.

In another aspect, the calculating, by the transmitting device, of the parameter L comprises calculating the parameter L based on expiration of waiting time for acknowledgment of the one or more UDP packets having the encrypted data.

In another aspect, the method includes storing, by the receiving device, in a first memory array a plurality of recovery UDP packets; storing, by the receiving device, in a second memory array the FEC data; and recovering, by the receiving device, at least one UDP data packet of the sequence of UDP data packet lost during transmission, the recovering based on the stored plurality of recovery UDP packets and the stored FEC data.

In one aspect, a system is provided for recovery of data packets transmitted from a sending device to a receiving device over a network. In this aspect, the system includes a DTLS encoder associated with the sending device and configured to encrypt data to be transmitted over the network; a forward error correction (FEC) encoder associated with the sending device configured to generate FEC data based on the encrypted data and a parameter L associated with a frequency of packet losses from the sending device to the receiving device over the network; and a network interface associated with the sending device configured to transmit a sequence of UDP data packet including the encrypted data and the FEC data to the receiving device, wherein the sequence of UDP packets comprises a number of L UDP packets having the encrypted data transmitted between each UDP packet having the FEC data.

In another aspect of the system, the receiving device is configured to calculate the parameter L and transmit the parameter L in a UDP packet to the sending device.

In another aspect of the system, the receiving device is configured to calculate the parameter L based on differences in at least one packet number of the UDP packets having the encrypted data from a sequence number of the DTLS protocol in sequentially arriving packets.

In another aspect of the system, the receiving device is configured to transmit the parameter L in the UDP packet by generating the UDP packet with the parameter L including a special byte sequence that is different than a byte sequence according to the DTLS protocol.

In another aspect of the system, the receiving device is configured to generate at least one UDP packet including data indicating an acknowledgement of one or more of the UDP packets having the encrypted data and to transmit the generated at least one UDP packet to the transmitting device, and the transmitting device is configured to calculate the parameter L based on the generated at least one UDP packet.

In another aspect of the system, the transmitting device calculates the parameter L based on expiration of waiting time for acknowledgment of the one or more UDP packets having the encrypted data.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

FIG. 4A illustrates a flow diagram of the system shown in FIG. 3 for providing the recovery of lost packets during data transmission according to an exemplary aspect.

FIG. 4B illustrates a refinement of the flow diagram shown in FIG. 4A for providing the recovery of lost packets during data transmission according to an exemplary aspect.

DETAILED DESCRIPTION

Figure 1:
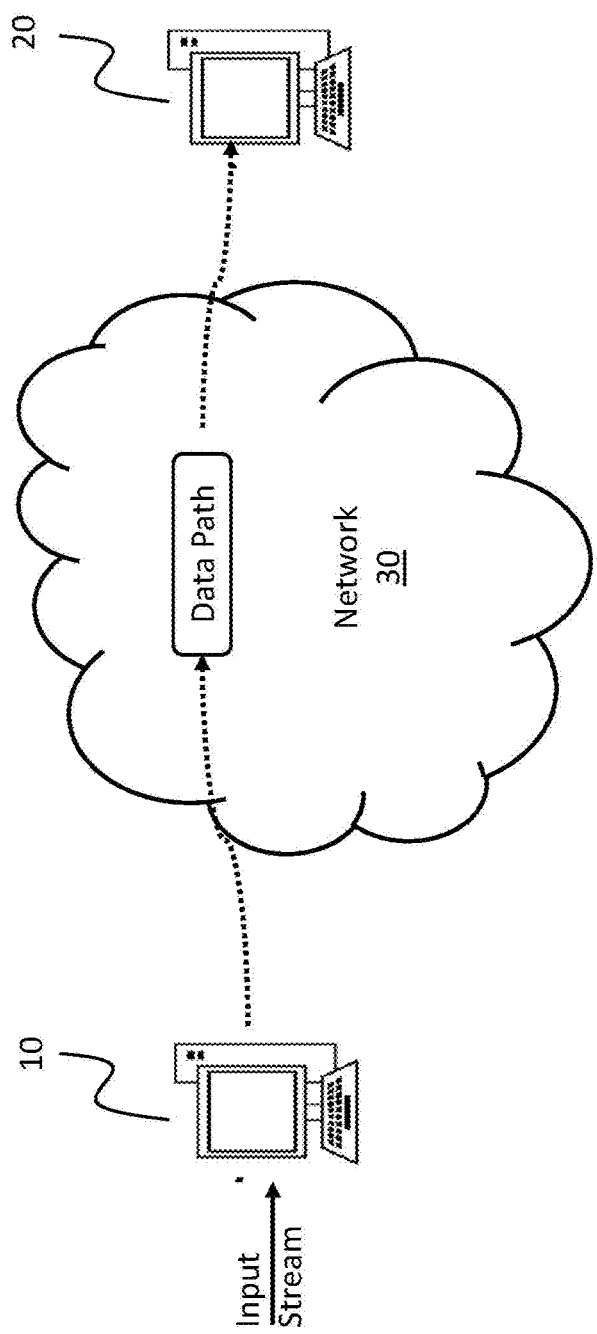
FIG. 1 illustrates a block diagram of a basic infrastructure for data packet transmission over an IP network.
Figure 2A:
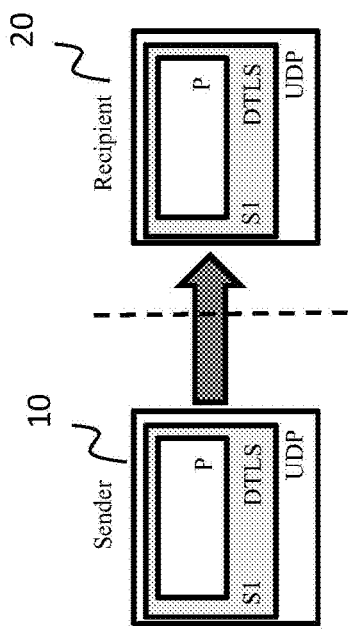
FIG. 2A illustrates a flow diagram for data packet transmission using the conventional infrastructure shown in FIG. 1.
Figure 2B:
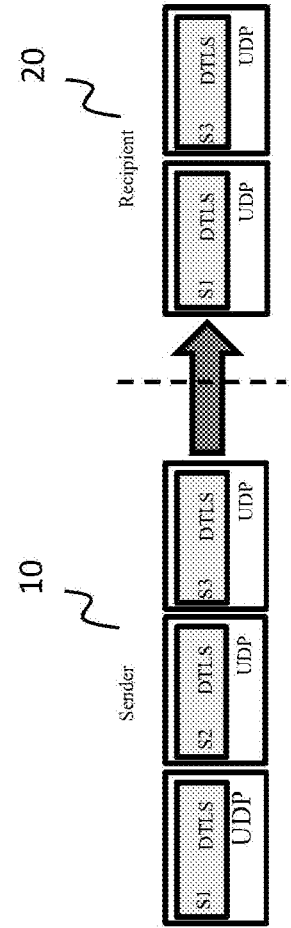
FIG. 2B illustrates another example of a flow diagram for data packet transmission using the conventional infrastructure shown in FIG. 1.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

Figure 3:
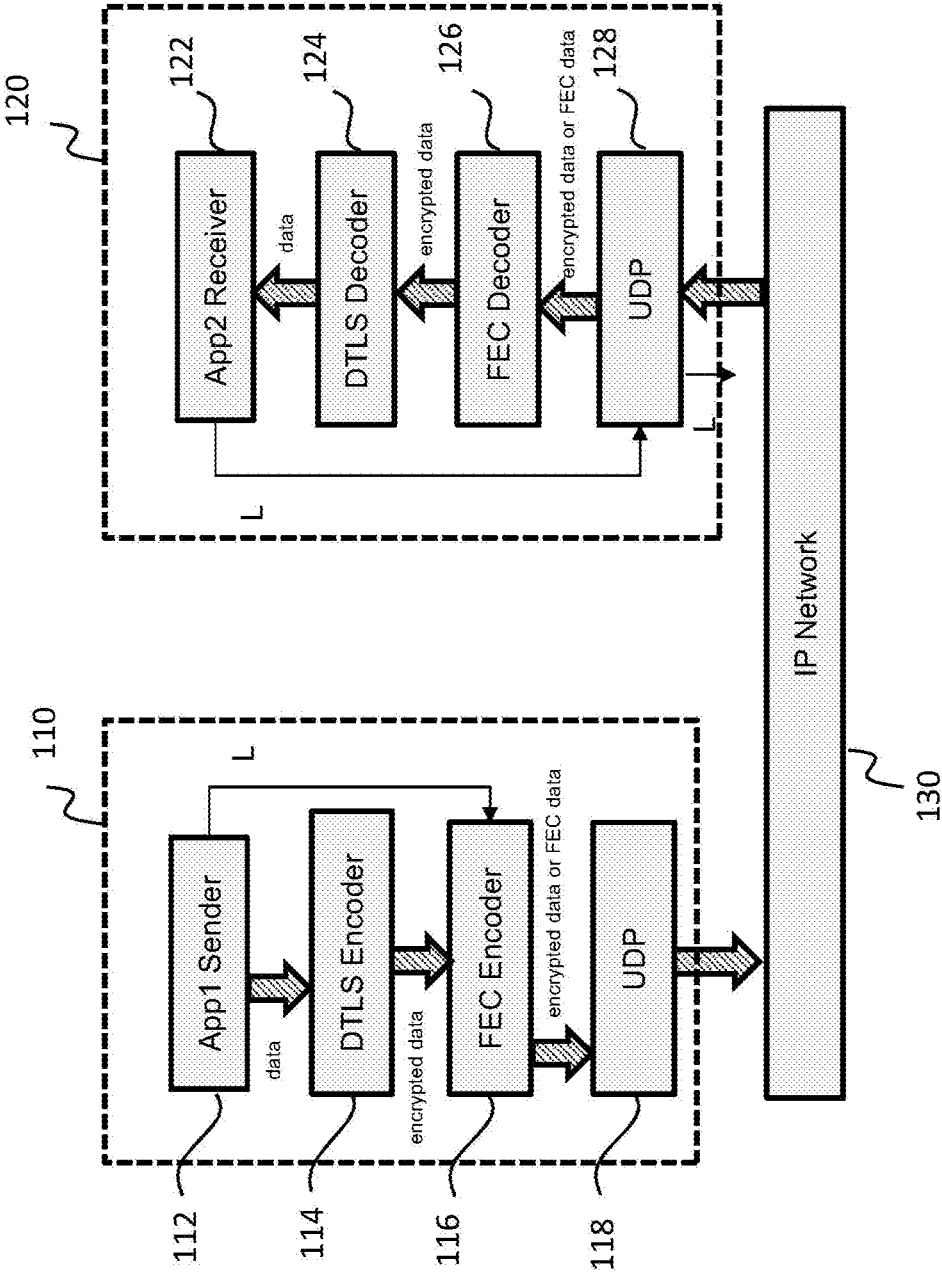
FIG. 3 illustrates a block diagram of a system for recovery of data packets transmitted over an unreliable network according to an exemplary aspect.

FIG. 3 illustrates a block diagram of a system for recovery of data packets transmitted over an unreliable network according to an exemplary aspect. As shown, the system 300 includes a sender 110 and recipient 120, which can each be any type of computing device, sender, etc., that includes a network interface controller, or similar hardware component, configured to transmit and receive data packets (i.e., datagrams) over an IP network 130.

According to the exemplary aspect, the system 300 provides for the recovery of data packets that may be lost if IP network 130 is unreliable by using the error correction method—FEC (Forward Error Correction). In general, FEC is a method of obtaining error control in data transmission where the sender 110 can send redundant data and the recipient 120 is configured to recognize only the portion of the data that contains no apparent errors. Thus, according to the exemplary aspect, sender 110 is configured to transmit additional information (i.e., an additional "F-packet") that can be used to restore lost information due to an unreliability of IP network 130. The use of error-correcting coding enables the system 300 to reduce the delay of the upper-level protocols and application protocols due to data recovery since the sender 110 will not need to retransmit the lost data packet.

In general, FIG. 7 described below provides an exemplary computing device showing hardware and software components for either sender 110 and/or recipient 120. However, for purposes of this disclosure, FIG. 3 provides a simplified block diagram illustrating the exemplary components for providing the recovery of lost packets during data transmission.

As shown, sender 110 can include a software application 112 (i.e., "App1 Sender") that is configured to generate and/or provide the content (e.g., the video and audio data) to be transmitted via real-time protocol ("RTP") and consumed by recipient 120. Moreover, a DTLS encoder 114 is provided to receive the data content and encrypt the data according to existing DTLS communication protocols. The encrypted data is then provided to an FEC encoder 116. As further shown, the sender 110 can generate (or the recipient can generate) and provide a parameter/value "L", which, as will be discussed below, is a value of the number of packets that is used for FEC-code calculation. Finally, the sender 110 generates UDP packets 118 using both the FEC data generated by the FEC encoder 116 and the encrypted data generated by the DTLS encoder 114. These data packets are transmitted over the IP network 130 to recipient 120 by a network interface controller, for example. It should be appreciate that while each of software application 112, DTLS encoder 114, and FEC encoder 116 are shown as being part of a single sending device 110, each of these components can be a separate software/hardware module on separate computing devices associated with the sender 110 and communicatively coupled to each other according to an alternative embodiment.

As further shown, recipient 120 has a similar configuration as sender 110. More particularly, recipient 120 receives the UDP packets 128, which ideally includes all UDP packets 118 transmitted by sender 110 (in which case data recovery is not required), but is likely only a portion of the transmitted UDP packets 118, since at least one or more of the packets will likely be lost during transmission over IP network 130, especially if the network is unreliable, as discussed above. Upon receipt, the UDP packets 128 (which are both the encrypted data and the FEC data) are fed to FEC decoder 126, which can decode the FEC-code for recovery of any one packet(s) previously transmitted by sender 110. Moreover, the encrypted data is then fed to DTLS decoder 124 where it is decrypted before being provided to the software application 122 (i.e., "App2 Receiver"), which is provided to consume the media content, for example, by display on a monitor, or the like, as would be understood to one skilled in the art. It should be appreciate that while each of software application 122, DTLS decoder 124, and FEC decoder 126 are shown as being part of a single receiving device 120, each of these components can be a separate software/hardware module on separate computing devices associated with recipient 120 that are communicatively coupled to each other according to an alternative embodiment.

FIG. 4A illustrates a flow diagram of the system 300 shown in FIG. 3 for providing the recovery of lost packets during data transmission according to an exemplary aspect. As shown, the sender 110 is configured to send a plurality of encrypted data packets S1, S3 and S2 and also an FEC packet F1, i.e., an "F-packet", that contains the FEC recovery code. The vertical dashed line is provided to illustrate the IP network, for example. Moreover, the recipient 120 is shown as receiving encrypted data packets S1 and S3, but shown to have not received data packet S2 since it is assumed that data packet S2 was lost due to the unreliability of IP network 130. However, using received F-packet F1, the recipient 120 is configured to recover data packet S2, which is shown having a dashed box.

Thus, according to the exemplary aspect, by providing the additional F-packet that contains an FEC-code, the recipient is able to recover any packet of the previously transmitted N packets, where 1<N<256. In the example of FIG. 4A, N=3 (i.e., S1-S3). Moreover, according to the exemplary aspect, the F-packet must be different from the DTLS-packet (i.e., a constant sequence of bytes at the beginning of the data). Thus, in this aspect, F-packet contains the starting $S_s$ and/or the last $S_e$ packet number that can be used by recipient 120 to calculate the recovery code. The F-packet F1 also contains the number of $L_f$ used packets for the calculation of the recovery code. F-packet F1 contains the calculated recovery FEC-code that enables the recipient 120 to recover any single packet from the range used for encoding according to the exemplary aspect.

According to an exemplary aspect, the recipient 120 saves the received packets in a recovery queue, where the recipient 120 can use the packets during a recovery phase. In one aspect, the recovery phase starts immediately when the recipient receives the F-packet. In general, a packet $S_i$ can be recovered with next computations: $S_i = S_s \oplus \ldots \oplus S_{i-1} \oplus S_{i+1} \oplus \ldots \oplus S_e \oplus F$, where operation $\oplus$ is an exclusive disjunction, $S_s$ is a first packet of sequence covered by F-packet and $S_e$ is a last packet of that sequence. The recipient 120 during the recovery phase performs the next computations to optimize performance, i.e., $F_r = F_r \oplus S_r$, $S_r$ is a latest received packet, where $F_r$ is a result of recovery computations, on start of recovery phase $F_r$ is F. Moreover, in the exemplary aspect, the recovery phase ends when only one packet is missed in sequence [$S_s, \ldots S_e$], or all packets are already received.

In order to ensure recoverability of all packets within a sequence of encrypted datagrams transmitted to the recipient 120, the sender 110 determines/obtains the frequency of packet losses during transmission to recipient 120. More particularly, as noted above, the sender 110 is configured to calculate a value "L", which is the value of packets involved as well as in the calculation of the recovery FEC-code and in restoration of lost information. The value L is required for use of the FEC-code and is shown to be provided to FEC encoder 116 in FIG. 3. Thus, according to the exemplary aspect, L is used by the sender 110 to determine the size of the interval (i.e., the number of DTLS-packets) between F-packets. Thus, accord to the example shown in FIG. 4A, L was determined to equal 3 as there were three encrypted UDP data packets S1-S3 between the F-packets (only one F-packet F1 is shown for illustrative purposes).

Moreover, according to the exemplary aspect, the value of number of packets L can be used for FEC-code calculation by recipient 120. For example, in this aspect, the recipient (e.g., "App2 receiver") is configured to calculate the FEC-code based on the frequency of packet losses according to the formula:

$S_i, S_j$—numbers of lost packets;

$L=|S_i-S_j|$; but if $L>2$ then $L=L-1$ else $L=2$.

In this example, the packet numbers S(i+1), S(i) can be derived from the parameter "sequence number" of the DTLS protocol.

FIG. 4B illustrates a modification of the flow diagram shown in FIG. 4A for providing the recovery of lost packets during data transmission according to an exemplary aspect. In this example, the same encrypted data packets S1-S3 and the F-packet F1 are being transmitted from sender 110 to recipient 120 as described above. However, as further shown and described above, the recipient 120 is configured to calculate the data value L and transmit this value as a UDP data packet R1 to sender 110. Upon receipt, the sender 110 can use this value L to both calculate the number of encrypted data packets between F packets and also for the FEC-code calculation, described above.

According to the exemplary aspect, the frequency of packet loss is calculated by the recipient 120 on the basis of differences in the packet's number from "sequence number" of DTLS protocol in sequentially arriving packets where the epoch parameter of the DTLS Protocol is constant. Accordingly, if the recipient 120 determines a change of the epoch value, the recipient 120 stops the calculation of the packet loss, and determines the current value for L which can be used and transmitted to sender 110 as shown. Then, the recipient 120 is configured to resume the calculation of the number of lost packets for the new epoch.

Thus, according to the exemplary aspect, the parameters "sequence number" and "epoch of the DTLS Protocol" are used to sort data packets S and F, for calculation of recovery FEC-code as well as for recovery of DTLS-data using the calculated FEC-code. As described above, the parameter L, calculated by the recipient 120 should be delivered to the sender 110 to generate the FEC-code suitable for current conditions of packet loss in the IP network 130. Thus, in one exemplary aspect, the recipient 120 is configured to continuously determine the frequency of lost packets and update the value L accordingly. By doing so, and transmitting the value L to sender 110, the system 300 can provide a reliable way of ensuring that any UDP packets sent by sender 110 that are lost during transmission can be recovered by recipient 120.

It should be appreciated that the algorithm described herein is not provided by the DTLS protocol or the UDP protocol. Rather, it is contemplated that the calculated number L is transmitted in a UDP packet R1 that differs from DTLS packet by a special byte sequence—i.e., a "magic sequence", such as 65, 70, 69, 67, for example. As a result, the sender 110 can identify and decode the packet R1 and use the value L, as described above.

It should be appreciate that while the exemplary aspect described above provides for the recipient 120 to calculate the value L, according to an alternative aspect, the sender 110 can calculate the value L directly. For example, if the recipient 120 cannot forward the number L or if the UDP packet with the value L is lost, the sender 120 can be configured to calculate the value of L using dynamic settings of applications protocol P in an encrypted DTLS packet S.

Figure 4C:
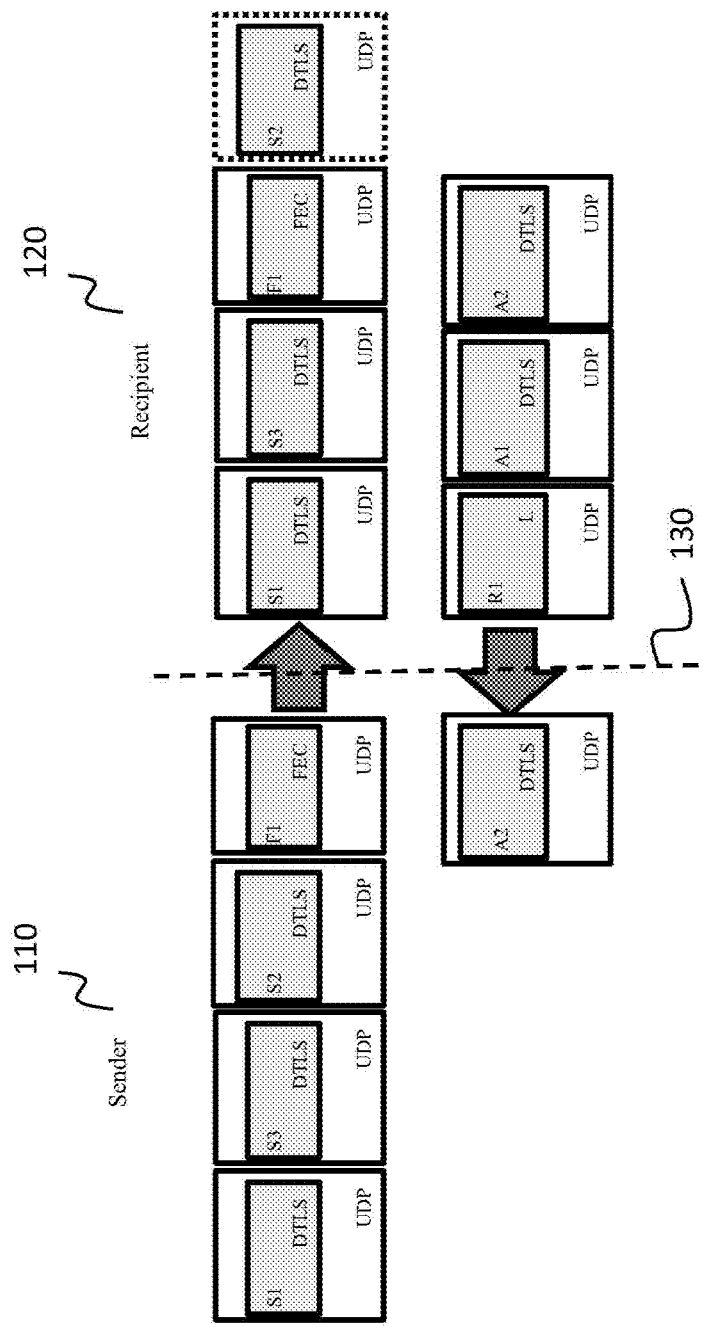
FIG. 4C illustrates a flow diagram of the system 300 shown in FIG. 3 for providing the recovery of lost packets during data transmission according to another exemplary aspect.

In particular, FIG. 4C illustrates a flow diagram of the system 300 shown in FIG. 3 for providing the recovery of lost packets during data transmission according to another exemplary aspect. In this example, the same encrypted data packets S1-S3 and the F-packet F1 are being transmitted from sender 110 to recipient 120 as described above with respect to FIGS. 4A and 4B. However, as further shown, this transmission scheme illustrates an example where packet R1 (that includes parameter L as described above) is lost, but an additional data packet A2 is received. In this case, the recipient is configured to generate and transmit data packets A1, A2, and so forth, that provide acknowledgement of receipt of the transmitted data packets S1, S2, S3 and so forth. In this aspect, the sender 110 is configured to calculate the value L using dynamic parameters of the protocol P with data reception confirmation, where the parameters can be, for example, (i) expiration of waiting time for acknowledgment of the transferred data, and (ii) reception of selective acknowledgment (e.g., data packet A2) of the data packets. Using these parameters, the sender 110 can calculate the value L that can be used for FEC-code calculation as described above. It should be appreciated that in one aspect, an application protocol P can be bidirectional and that sender 110 will receive packets from recipient 120. Moreover, sender 110 will compute L as described above a basis of sequence received packets.

Figure 5:
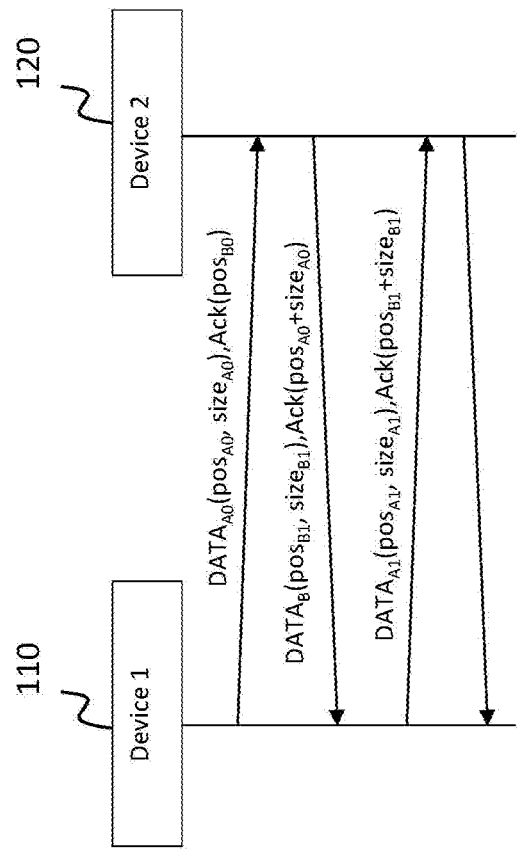
FIG. 5 illustrates another flow diagram for providing the recovery of lost packets during data transmission according to another exemplary aspect.

FIG. 5 illustrates another flow diagram for providing the recovery of lost packets during data transmission according to another exemplary aspect. In particular, the flow diagram shown represents a method for a duplex transmission protocol between two devices (i.e., "device 1" and "device 2"). It should be appreciated that device 1 is shown as sender 110 and device 2 is shown as recipient 120, as described above, but that each device is communicating data back and forth (over IP network 130, for example) according to the exemplary aspect.

Thus, in the exemplary aspect, the method 400 is provided to transmit data from device 1 (e.g., sender 110) to device 2 (e.g., recipient 120) and back. More particularly, the method 400 transmits data from one side to another and then sends acknowledgment of received data. In this aspect, the exemplary protocol can sends block of data (e.g., UDP packets as discussed above) with two mandatory fields: "DATA" and "Ack" (i.e., acknowledgement). Furthermore, the "DATA" field contains two subfields: (1) position of data in data stream in bytes; and (2) size of data in bytes of the packet. Moreover, the "Ack" field contains position data of last received byte in data stream, which will usually have a value that equals a sum of the position and size from the packet received from counterpart side.

According to the exemplary aspect, on the side of the recipient 120, for example, there will be two phases of processing network data: Normal and Recover/Recovery. One skilled in the art would understand that in the Normal phase, there will not be any lost packets so the sending of the FEC packets as described above it not required. In contrast, recipient will operate in the recovery phase if there is at least one packet loss (e.g., in DTLS or P) and/or the FEC packet is received by the recipient 120.

On the start of the recovery phase, the recipient 120 sends a value for $L_{start}$ (e.g., $L_{start}=5$) to the sender 110 and starting collecting data packets in a recovery queue (e.g., some form of memory array, such as a ring buffer, for example). Thus, in this aspect, the recipient 120 will store/maintain the data packets in the internal queue (e.g., an ordered array) to provide more opportunities to recover packets that are covered by the previously received FEC packet or will be covered by next FEC packet received from sender 110. Moreover, in the exemplary aspect, the length/size of the internal queue preferably depends on the max L value sent to sender 110, as described above.

Furthermore, in the exemplary aspect, the recipient 120 will store the FEC packet(s) in an additional FEC queue (e.g., some form of memory array, such as a ring buffer, for example) that covers packets in a range [$F_{start}$, $F_{end}$], where $F_{start}$ is the smallest covered sequence number by the FEC queue and $F_{end}$ is the biggest sequence number covered by the FEC queue. In addition, the recipient 120 is preferably configured to remove any data packets with a sequence number less $F_{start}$ from the recovery queue. Moreover, FEC packets should be removed from the FEC queue when the covered range of sequence numbers is less than a sequence number of latest received packet.

In the exemplary aspect, to optimize a recover process, each received data packet $S_i$ with sequence number within a range [$F_{start}$, $F_{end}$] should participate in FEC computation to remove itself from a range and re-calculate the FEC packet by a formula $F_{new}=F_{prev} \oplus S_i$, where operation $\oplus$ is an exclusive disjunction, $F_{new}$ is a recalculated value of FEC packet, $F_{prev}$ is a previous value or original value of FEC packet, and $S_i$ is the received data packet. In this aspect, re-calculation of the FEC packet can be started when original FEC packet $F_{orig}$ is received from network by recipient 120, and the first received data packet $S_j$, at start $F_{prev}=F_{orig}$. The re-computed FEC packet $F_{new}=F_{prev} \oplus S_i$, will still cover data packets with sequence numbers in a range [$F_{start}$, $F_{end}$] except a packet $S_i$. For all additionally received data packets in a range [$F_{start}$, $F_{end}$], $F_{prev}=F_{new}$ (from the previous calculation of $F_{new}$), and operation of calculation of $F_{new}$ will remove all received packets from a range [$F_{start}$, $F_{end}$]. When calculation of $F_{new}$ has already been used, all packets from a range except one, which is left unreceived, then $F_{new}$ has a recovered value of unreceived or lost packet. According to this aspect, this optimization only requires to keep in memory only $F_{new}$—i.e., the recalculated value of the FEC packet.

Figure 6:
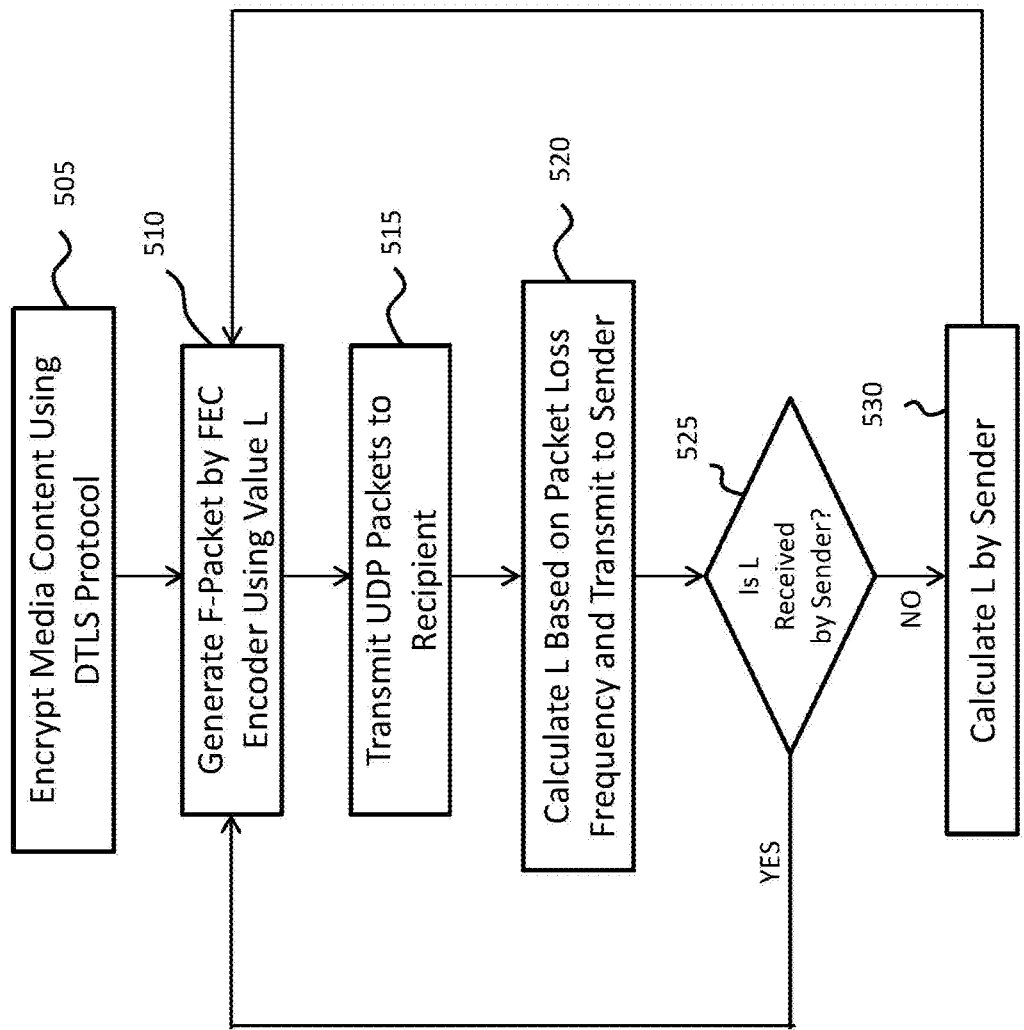
FIG. 6 illustrates a flowchart for a method for providing the recovery of lost packets during data transmission according to another exemplary aspect.

FIG. 6 illustrates a flowchart for a method for providing the recovery of lost packets during data transmission according to another exemplary aspect. It is noted that the following method 500 is described below making reference to the components discussed above with respect to FIGS. 3-4C. As shown, initially, at step 505, the sender 100 generates and/or received media content and encrypts the media content using DTLS protocol. It is noted that while DTLS protocol is shown as an example, it is contemplated that the aspects described herein and also be performed with non-encrypted data and/or using similar data communication/encryption protocols, for example.

Next, at step 510, the encrypted data is fed to an FEC encoder and used to generate an F-packet(s) based on the parameter L. Then, at step 515, the encrypted data (which is a sequence of L encrypted data packets) and the F-packet is transmitted over an IP network 130 as UDP data packets. As described above, if L=3, the sequence will be S1, S2, S3, F1, S4, S5, S6, F2, and so forth so that an F-packet is transmitted every three encrypted UDP data packets. Upon receipt, the recipient 120 is configured to decode the UDP packets and consume (by display, for example) the media content contained therein. In addition, according to the exemplary aspect, at step 520, the recipient 120 is configured to calculate the value L based on frequency of packet loss using the algorithm described above and also transmit this value L, in a data packet R1, to sender 110.

Next, at step 525, the sender 110 determines whether it has received the data packet R1, containing value L. As described above, the value L can be transmitted in the UDP packet R1 that differs from DTLS packet by a special byte sequence—i.e., a "magic sequence". This enables the sender to identify packet R1 and obtain value L. If the value L is received, the sender 110 can provide this value L to the FEC encoder where the F-packet is generated at step 510, as described above. Otherwise, the sender 110 is configured to calculate the value L using dynamic parameters of the protocol P with data reception confirmation, as described above.

It should be appreciated that according to the exemplary aspect, the disclosed system and method advantageously does not require changes to data packet transmission for either UDP and/or DTLS packets. Rather, the use of error-correcting coding allows to reduce the delay of the upper-level protocols, application protocols due to data recovery, and does not require the retransmission of any lost data packets.

Figure 7:
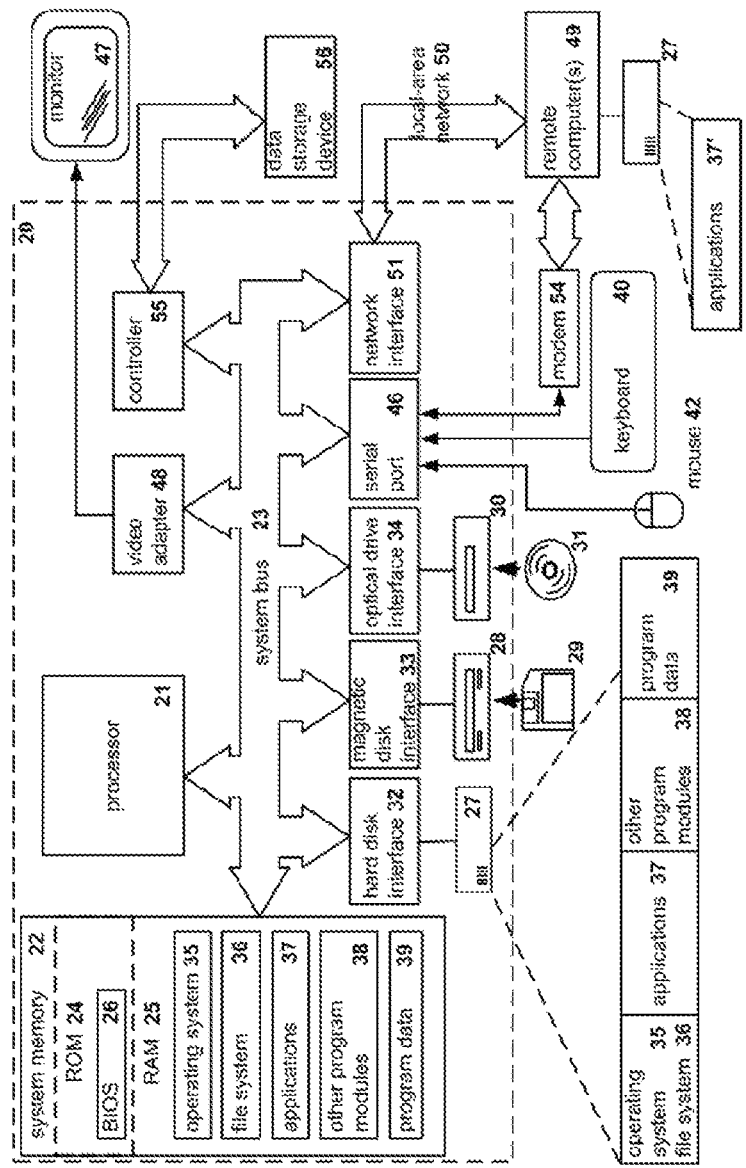
FIG. 7 illustrates a block diagram of an example of a general-purpose computer system on which the disclosed system and method can be implemented according to an example aspect.

FIG. 7 illustrates a block diagram of an example of a general-purpose computer system (which can be a server) on which the disclosed system and method can be implemented according to an example aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to either of sender 110 and/or recipient 120.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another of the recipient 120 or sender 110. For example remote computer 49 can be a computer, a server, a router, a network PC, a peer device or other common network node, and typically includes many or all of the elements described above relative to the computer 20. The logical connections include a network interface 51 and connected to a local area network (i.e., LAN) 51, for example, and/or a wide area network (not shown), the IP network 130, or the like. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for recovery of data packets transmitted from a sending device to a receiving device over a network, the method comprising:
    calculating, by the receiving device, a parameter L associated with a frequency of packet losses in the data packets transmitted from the sending device to the receiving device over the network;
    transmitting, by the receiving device, the parameter L in a UDP packet to the sending device;
    receiving, from the sending device, a sequence of UDP data packets including (i) data encrypted by the sending device prior to being transmitted to the receiving device, the encryption being performed using a protocol with encryption and numbering and (ii) Forward Error Correction (FEC) data generated by the sending device, wherein the sequence of UDP packets comprises a number of L UDP packets having the encrypted data transmitted between each UDP packet having the FEC data, wherein the FEC data is generated based on the encrypted data and the parameter L; and
    calculating, by the receiving device, the parameter L based on, for sequentially arriving UDP packets, differences between a number of each packet of the sequentially arriving packets and a sequence number of the respective protocol with encryption and numbering.

2. The method according to claim 1, wherein the protocol with encryption and numbering comprises a Datagram Transport Layer Security (DTLS) protocol.

3. The method according to claim 2, wherein the transmitting, by the receiving device, of the parameter L in the UDP packet comprises generating the UDP packet with the parameter L including a special byte sequence that is different than a byte sequence according to the DTLS protocol.

4. The method according to claim 1, further comprising:
    generating, by the receiving device, at least one UDP packet including data indicating an acknowledgement of one or more of the UDP packets having the encrypted data;
    transmitting, by the receiving device, the generated at least one UDP packet to the transmitting device; and
    calculating, by the sending device, the parameter L based on the generated at least one UDP packet.

5. The method according to claim 4, wherein the calculating, by the sending device, of the parameter L comprises calculating the parameter L based on an expiration of a waiting time for an acknowledgment of transferred UDP packets having encrypted data.

6. The method according to claim 1, further comprising:
    storing, by the receiving device, in a first memory array a plurality of recovery UDP packets;
    storing, by the receiving device, in a second memory array the FEC data; and recovering, by the receiving device, at least one UDP data packet of the sequence of UDP data packets lost during transmission, the recovering based on the stored plurality of recovery UDP packets and the stored FEC data.

7. A system for recovery of data packets transmitted from a sending device to a receiving device over a network, the system comprising:
  an encoder associated with the sending device and configured to encrypt data using a protocol with encryption and numbering, the encrypted data being data to be transmitted over the network;
  a forward error correction (FEC) encoder associated with the sending device configured to generate FEC data based on the encrypted data and a parameter L associated with a frequency of packet losses in the data packets transmitted from the sending device to the receiving device over the network, wherein the receiving device is configured: to calculate the parameter L based on, for sequentially arriving UDP packets, differences between a number of each packet of the sequentially arriving packets and a sequence number of the respective protocol with the encryption and numbering, and to transmit the parameter L in a UDP packet to the sending device; and
  a network interface associated with the sending device configured to transmit a sequence of UDP data packets including the encrypted data and the FEC data to the receiving device,
  wherein the sequence of UDP packets comprises a number of L UDP packets having the encrypted data transmitted between each UDP packet having the FEC data.

8. The system to claim 7, wherein the protocol with encryption and numbering comprises a Datagram Transport Layer Security (DTLS) protocol.

9. The system according to claim 8, wherein the receiving device is configured to transmit the parameter L in the UDP packet by generating the UDP packet with the parameter L including a special byte sequence that is different than a byte sequence according to the DTLS protocol.

10. The system according to claim 7,
  wherein the receiving device is configured to generate at least one UDP packet including data indicating an acknowledgement of one or more of the UDP packets having the encrypted data and to transmit the generated at least one UDP packet to the sending device, and
  wherein the transmitting device is configured to calculate the parameter L based on the generated at least one UDP packet.

11. The system according to claim 7, wherein the sending device calculates the parameter L based on an expiration of a waiting time for an acknowledgment of transferred UDP packets having encrypted data.

12. The system according to claim 7, wherein the receiving device is further configured to:
  store in a first memory array a plurality of recovery UDP packets,
  store in a second memory array the FEC data; and
  recover at least one UDP data packet of the sequence of UDP data packets lost during transmission, the recovering based on the stored plurality of recovery UDP packets and the stored FEC data.

13. A non-transitory computer readable medium storing thereon computer executable instructions for recovery of data packets transmitted from a sending device to a receiving device over a network, including instructions for:
  receiving, from the sending device, a sequence of UDP data packets including (i) data encrypted by the sending device prior to being transmitted to the receiving device, the data being encrypted using a protocol with encryption and numbering and (ii) Forward Error Correction (FEC) data generated by the sending device, wherein the sequence of UDP data packets comprises a number of L UDP packets having the encrypted data transmitted between each UDP packet having the FEC data, wherein the FEC data is generated based on the encrypted data and a parameter L associated with a frequency of packet losses in the data packets transmitted from the sending device to the receiving device over the network; and
  calculating, by the receiving device, the parameter L based on, for sequentially arriving UDP packets, differences between a number of each packet of the sequentially arriving packets and a sequence number of the respective protocol with encryption and numbering.

14. The non-transitory computer readable medium according to claim 13, wherein the protocol with encryption and numbering comprises a Datagram Transport Layer Security (DTLS) protocol.

15. The non-transitory computer readable medium according to claim 14, wherein the transmitting, by the receiving device, of the parameter L in the UDP packet comprises generating the UDP packet with the parameter L including a special byte sequence that is different than a byte sequence according to the DTLS protocol.

16. The non-transitory computer readable medium according to claim 13, further comprising instructions for:
  generating, by the receiving device, at least one UDP packet including data indicating an acknowledgement of one or more of the UDP packets having the encrypted data;
  transmitting, by the receiving device, the generated at least one UDP packet to the transmitting device; and
  calculating, by the sending device, the parameter L based on the generated at least one UDP packet.

17. The non-transitory computer readable medium according to claim 16, wherein the calculating, by the sending device, of the parameter L comprises calculating the parameter L based on an expiration of a waiting time for an acknowledgment of transferred UDP packets having encrypted data.

* * * * *